S. ROOT.
Peat Machine.

No. 62,289.

Patented Feb. 19, 1867.

Witnesses:

Inventor

United States Patent Office.

SAMUEL ROOT, OF NEW HAVEN, CONNECTICUT, ASSIGNOR TO HIMSELF AND W. H. CLARK, OF SAME PLACE.

Letters Patent No. 62,289, dated February 19, 1867.

IMPROVED PEAT MACHINE.

*The Schedule referred to in these Letters Patent and making part of the same.*

TO ALL WHOM IT MAY CONCERN:

Be it known that I, SAMUEL ROOT, of New Haven, in the county of New Haven, and State of Connecticut, have invented a new improvement in Peat Machine; and I do hereby declare the following, when taken in connection with the accompanying drawings, and the letters of reference marked theron, to be a full, clear, and exact description of the same, and which said drawings constitute part of this specification, and represent, in—

Figure 1:
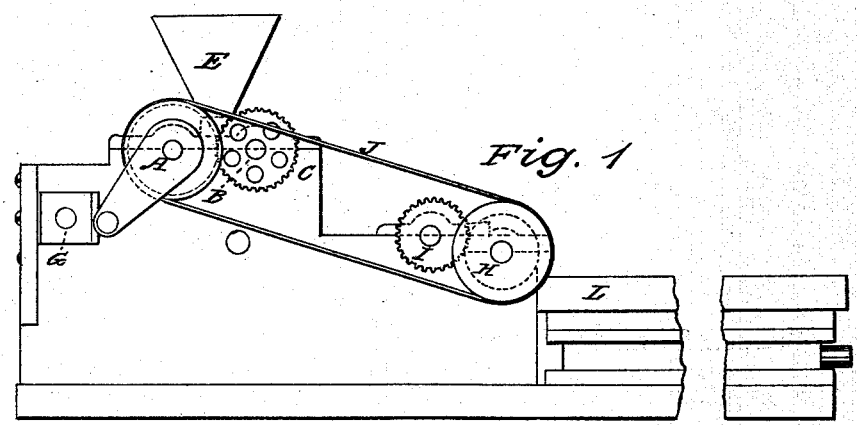
Figure 2:
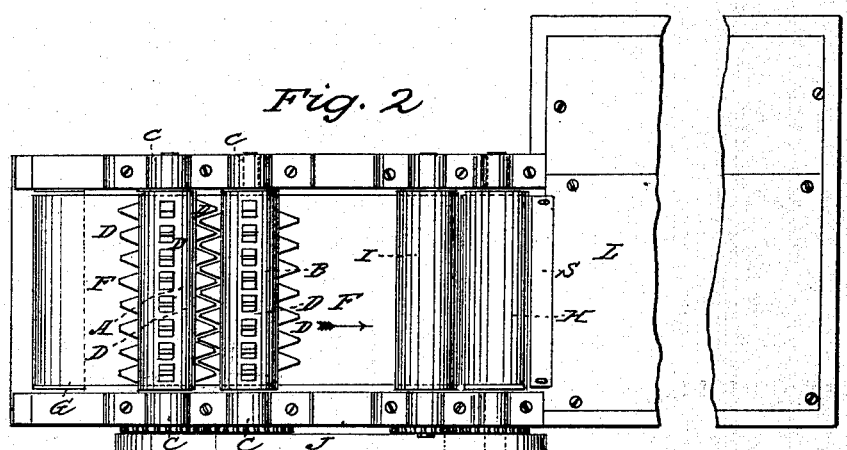
Figure 3:
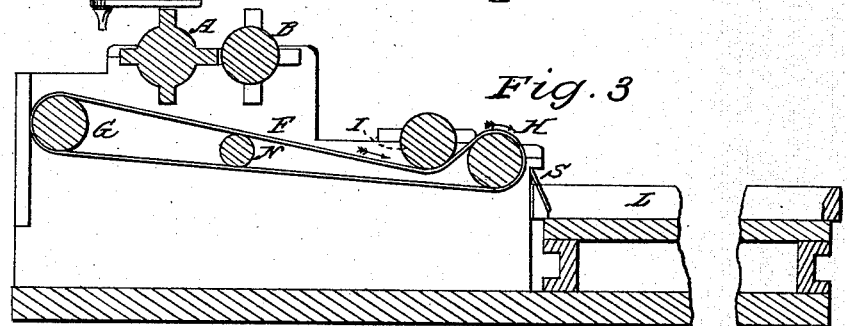

Figure 1, a side view.
Figure 2, a top view; and in
Figure 3, a longitudinal vertical central section.

This invention relates to an improvement in apparatus for the preparation of peat for fuel, and consists of a grinding, mashing, or breaking apparatus, combined with a heated table for drying the peat.

To enable others to construct and use my improvement, I will proceed to describe the same as illustrated in the accompanying drawings.

A and B are two cylinders, supported so as to revolve freely in bearings C, their surfaces provided with projecting flanges or teeth D, meshing the one into the other; to these cylinders power is applied to cause them to revolve in any convenient manner. Above and centrally between the two cylinders is arranged a hopper, E, (see fig. 1.) Below the two cylinders A and B is arranged an endless apron, F, denoted by heavy black lines in fig. 3. This apron passes over a cylinder, G, at one end, and a corresponding cylinder, H, at the other end, the upper surface passing under a cylinder, I, located near the cylinder H. A belt, J, or similar device, from one of the cylinders A to the cylinder H, as denoted in fig. 1, causes the cylinder H to revolve and move the apron in the direction denoted by the arrow. Beyond the cylinder H is arranged a table, L, constructed and arranged so that steam or other heat may be admitted beneath the surface of the table, the surface of the table being flat and smooth. A scraper, S, is arranged in front of the cylinder H, lying closely to the surface of the apron. The peat is first placed in the hopper, through which it passes on to the cylinders A and B, and by these cylinders mashed and ground into a homogeneous mass, falling upon the apron below; thence it is carried along, passing beneath the cylinder I, and between the two cylinders I and H much of the water is expressed; thence the peat is carried over the cylinder H, and removed therefrom by the scraper S, and falls upon the heated table L, and is distributed over the surface of this table by the workmen stationed for the purpose. Coming as it does from the action of the machinery on to the table with most of the water expressed, the heated table soon brings the peat to a state sufficiently dry for compressing. The exhaust steam from the engine which drives the machinery is generally sufficient to produce the required heat in the table, yet, if necessary, live steam may be admitted. The surface of the cylinder I should be made slightly concave, so as to incline the apron to either side for the purpose of conducting the water therefrom. A cylinder, N, may be placed beneath the apron, and near the point where the peat falls, for the purpose of sustaining the apron.

Having thus fully described my invention, what I claim as new and useful, and desire to secure by Letters Patent, is—

The combination of the two grinding cylinders A and B with the apron F, scraper S, and table L, constructed and arranged to operate together substantially as and for the purpose set forth.

SAMUEL ROOT.

Witnesses:
JOHN H. SHUMWAY,
A. J. TIBBITS.